US005631995A

United States Patent [19]
Weissensteiner et al.

[11] Patent Number: 5,631,995
[45] Date of Patent: May 20, 1997

[54] VIDEO RECORDER HAVING CIRCUITRY FOR CAUSING THE TUNER THEREIN TO TUNE TO THE SAME RECEIVED SIGNAL AS THE TUNER IN A TELEVISION RECEIVER CONNECTED TO THE VIDEO RECORDER

[75] Inventors: Walter Weissensteiner, Vienna, Austria; Klaas H. J. Robers, Valkenswaard, Netherlands

[73] Assignee: U.S. Philips Corporation, New York, N.Y.

[21] Appl. No.: 213,773

[22] Filed: Mar. 16, 1994

[30] Foreign Application Priority Data

Apr. 1, 1993 [AT] Austria .................. 674/93

[51] Int. Cl.$^6$ .................. H04N 5/91; H04N 9/00; H04N 7/00; H04N 11/00
[52] U.S. Cl. .................. 386/1; 386/46; 386/83; 455/2; 455/140; 455/184.1
[58] Field of Search .................. 358/335; 348/731, 348/732, 1, 4, 5; 360/33.1; 455/2, 140, 184.1; 386/1, 46, 83

[56] References Cited

U.S. PATENT DOCUMENTS

| | | | |
|---|---|---|---|
| 2,903,508 | 9/1959 | Hathaway | 178/6 |
| 3,372,233 | 3/1968 | Currey | 178/69.5 |
| 3,614,625 | 10/1971 | Mayle, Jr. | 325/307 |
| 4,079,419 | 3/1978 | Siegle et al. | 358/193 |
| 4,291,414 | 9/1981 | Kimura | 455/164 |
| 4,499,601 | 2/1985 | Matthews | 455/166 |
| 4,879,611 | 11/1989 | Fukui et al. | 360/69 |
| 4,885,632 | 12/1989 | Mabey et al. | 358/84 |

FOREIGN PATENT DOCUMENTS

| | | | |
|---|---|---|---|
| 3613796 | 10/1987 | Germany | H04N 5/782 |
| 2126002 | 3/1984 | United Kingdom . | |

OTHER PUBLICATIONS

"Korrelationstechnik ein neuer Zweig der Betriebsmebtechnik", Wolfgang Wehrmann u.a., ISBM 3-88146-104-3.
"Integrated video programming system (VPS) decoder", by A. Lentzer et al., Electronic Components and Applications, vol. 8, No. 1, pp. 39–43.

*Primary Examiner*—Tommy P. Chin
*Assistant Examiner*—David R. Vincent
*Attorney, Agent, or Firm*—Edward W. Goodman

[57] ABSTRACT

In a video recorder (2) having an electronically tunable tuner (19) and a connector (4) to which a cabling (6) can be connected, which cabling can also be connected to a connector (5) of a television receiver (3) which also has a tuner (46), at least one comparison device (69, 75, 130) of the video recorder (2) is connected to the tuner (19) of the video recorder (2) and to the connector (4) of the video recorder (2) via each time one connection (65, 66, 73, 77) in order to compare at least one component of one of the two received signals supplied by the tuner (46) of the television receiver (3) and applied to the connector (4) thereof with the corresponding component of the received signal supplied by the tuner (19) of the video recorder (2), which comparison device (69, 75, 130) supplies an inequality signal in the case of inequality of the signals applied to it, and an equality signal in the case of equality of the signals applied to it, the tuner (19) of the video recorder (2) being successively tuned to different stations when the inequality signal is produced and the tuner (19) of the video recorder (2) being kept tuned to a station when the equality signal is produced.

16 Claims, 3 Drawing Sheets

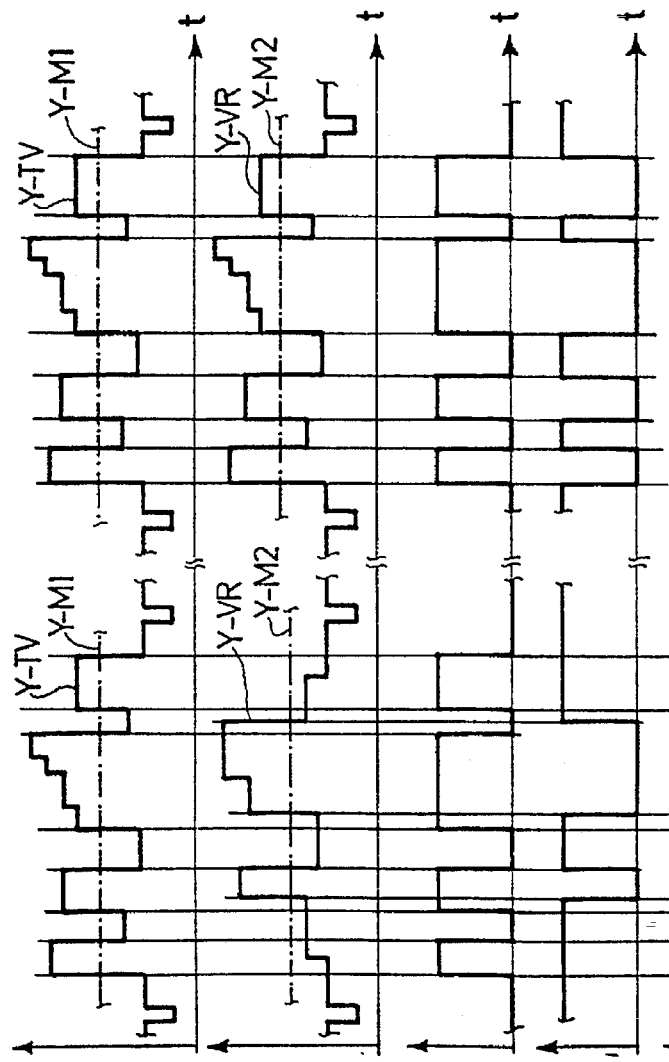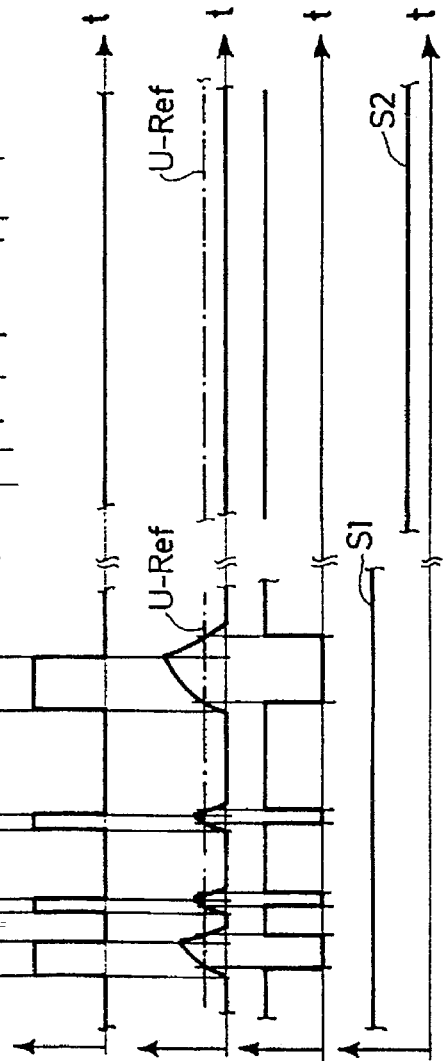

VIDEO RECORDER HAVING CIRCUITRY FOR CAUSING THE TUNER THEREIN TO TUNE TO THE SAME RECEIVED SIGNAL AS THE TUNER IN A TELEVISION RECEIVER CONNECTED TO THE VIDEO RECORDER

BACKGROUND OF THE INVENTION

1. Field of the Invention

The invention relates to a video recorder having an electronically tunable tuner which can, be tuned to each time one station of a plurality of stations and, after it has been tuned to a station, supplies a received picture signal and a received sound signal, and having a connector to which a cabling can be connected, which cabling can also be connected to a connector of a television receiver which also has a tuner which can be tuned to each time one station of a plurality of stations and, after it has been tuned to a station, supplies a received picture signal and a received sound signal, which received signals can both be applied to the video recorder via the cabling.

2. Description of the Related Art

Such a video recorder is generally known in a multitude of versions. For example, such a video recorder manufactured by the Applicant has been marketed under the type number VR 6760. Such a video recorder can form a video system comprising a television receiver and this video recorder, which television receiver and video recorder may be constructed as separate units or may be combined to form a single unit. In such a video system, the tuner of the television receiver and the tuner of the video recorder are frequently tuned to different stations transmitting different programs, i.e. different program signals. However, the user of the video system often wishes to have the possibility of properly and rapidly receiving the same program signal by means of the tuner of the video recorder as by means of the tuner of the television receiver, for example, in order to apply a program signal corresponding to the television program being watched on the television receiver by the user to the recording electronics of the video recorder via the tuner of the video recorder, to record this very program signal by means of the video recorder, regardless of whether during such a recording the television receiver is set to another television program or is even turned off. For this purpose, the tuner of the video recorder should be tuned accurately and as rapidly as possible to a station broadcasting the same program signal as that transmitted by the station to which the tuner of the television receiver has been tuned. Until now, in order to obtain such a tuning of the tuner of the video recorder, the user should several times start, for example, a search tuning mode of the tuner of the video recorder until the tuner of the video recorder is tuned to a station broadcasting the same program signal as that transmitted by the station to which the tuner of the television receiver has been tuned. Such a tuning operation, which should be effected as rapidly and accurately as possible, demands a comparatively high concentration from the user in order to avoid errors, and has the disadvantage that most users consider it to be intricate and not very convenient. In addition, it is to be noted that a program signal consists of a picture signal and a sound signal and, optionally, additional signals such a teletext signal, a video programming system (VPS) signal, a stereo pilot signal, or a bilingual pilot signal.

SUMMARY OF THE INVENTION

It is an object of the invention to mitigate the above problems and to achieve that in a video recorder of the type defined in the opening paragraph, a user can tune the tuner of the video recorder as rapidly and accurately as possible to a station broadcasting the same program signal as transmitted by the station to which the tuner of the television receiver associated with the video recorder has been tuned. To this end, the invention is characterized in that at least one comparison device of the video recorder is connected to the tuner of the video recorder and to the connector of the video recorder in order to compare at least one component of one of the two received signals supplied by tuner of the television receiver and applied to the video recorder, with the corresponding component of the received signal supplied by the tuner of the video recorder, in that such a comparison device is adapted to supply an inequality signal in the case of inequality of the two received signals supplied to it and to supply an equality signal in the case of equality of the two received signals supplied to it, and in that the tuner of the video recorder is successively tuned to different stations when such a comparison device supplies an inequality signal and the tuner of the video recorder is kept tuned to a station when such a comparison device supplies an equality signal.

In this way it is achieved that in dependence upon an inequality signal from such a comparison device, the tuner of the video recorder is automatically tuned electronically to different stations in succession, the tuner being tuned to different stations until a station is found which transmits the same program signal as that transmitted by the station to which the tuner of the television receiver has been tuned. In general, the station to which the tuner of the video recorder has been tuned and the station to which the tuner of the television receiver has been tuned will correspond. However, after a tuning process started by an inequality signal and after termination of this tuning process when an equality signal is received the tuner of the video recorder and the tuner of the television receiver may also be tuned to different stations when two television transmitters transmit the same television program and, consequently, the same program signal at different transmission frequencies. Such a tuning process in accordance with the invention can be started automatically upon each change of station in the television receiver or it can also be started deliberately by the user, for example, by a single actuation of a key and no further additional actuating operations, so that no special attention is demanded from the user and a great ease of operation is achieved. Preferably, such a tuning process proceeds comparatively quickly, so that the tuner of the video recorder is rapidly tuned to a desired station. Rapid tuning of the tuner of the video recorder to a transmitter which transmits the same program signal as a transmitter to which the tuner of the television receiver has been tuned has, for example, the advantage that a program signal supplied by the tuner of the television receiver and corresponding to a television program followed by the user by means of the television receiver can also be accurately and rapidly supplied by the tuner of the video recorder and applied to the recording electronics of the video recorder in order to record this program signal by means of the video recorder. After the tuner of the video recorder has been tuned to a desired station, the program signal supplied by this tuner can be recorded by means of the video recorder, during which recording process, the television receiver may already be switched over to receive another program signal or may even be switched off. However, it may also be advantageous to use the tuning of the tuner of the video recorder in accordance with the invention to transfer a given assignment of certain stations to a number of numbered station selection keys of the television receiver very simply and conveniently to the same number of equally numbered station selection keys on the video recorder or a remote control device for this video recorder, for which it is merely required to actuate a station selection key with a given number on the television receiver, after which the tuner of the video recorder is tuned to receive the program signal selected by the previously actuated station selection key on the television receiver, for example, automatically or by the generation of a respective activation signal, after which this tuning is assigned to a station selection key with a given, preferably the same, number on the video recorder, or on a remote control device for this video recorder, and is stored. In this way stations transmitting the same program signals can be assigned simply and easily to selection keys on the television receiver and on the video recorder or on a remote control device for this video recorder, which keys preferably have the same numbers.

It is to be noted that it is known, for example from DE 36 13 796 A1, to use the cabling of a video system comprising a television receiver and a video recorder connected to this television receiver via a multi-core cabling at least partly for the transmission of digital dam, so that a data bus is available, and to transmit digital data characterizing a station and stored in a storage device of the television receiver, by means of which data the tuner of the television receiver can be tuned to a station, to the video recorder via the data bus and store said data in a storage device in this recorder, so that by means of the data thus transmitted to the video recorder, the tuner of the video recorder can also be tuned to the same station as the tuner of the television receiver. However, in such a video system a connection suitable for use as a data bus is required between the television receiver and the video recorder, and the television receiver and the video recorder should have storage devices for storing the digital data characterizing a station, which steps are not necessary in conjunction with a video recorder in accordance with the invention, which is advantageous.

It is further known from DE 36 13 796 A1 to apply the data line contained in a television program signal received by television receiver and representing a station and program identification to a video recorder via a multi-core cabling connecting this recorder to the television receiver, which recorder in the same way as the television receiver includes a data line decoder by means of which the applied data line is decoded so as to identify the station or program received by the television receiver in the video recorder, after which the data corresponding to the identified station or the identified program and stored in a storage device of the video recorder is read out in order to tune the tuner of the video recorder to the same station or the same program received by the television receiver. However, in such a video system at least the video recorder should have a data line decoder and a storage device for tuning data, which advantageously are not required in a video recorder in accordance with the invention.

For a video recorder in accordance with the invention, it has proved to be very advantageous if the received picture signal supplied by the tuner of the television receiver and applied to the video recorder and the received picture signal supplied by the tuner of the video recorder are applied to said comparison device, and the comparison device is adapted to compare the luminance signal components of two picture signals. Owing to the provision of a comparison device for comparing the luminance components of two picture signals, the comparison for the detection of identical program signals can be very reliable.

For a video recorder in accordance with the invention, it has also proved to be very advantageous if the received sound signal supplied by the tuner of the television receiver and applied to the video recorder, to the connector thereof, and the received sound signal supplied by the tuner of the video recorder are applied to said comparison device, and the comparison device is adapted to compare the two sound signals. Owing to the provision of a comparison device for comparing two sound signals the comparison for the detection of identical program signals can again be very reliable. In a video recorder in accordance with the invention, a very high detection reliability is achieved if the recorder has both a comparison device for comparing the luminance components of two picture signals and a comparison device for comparing two sound signals.

A video recorder in accordance with the invention may have differently constructed comparison devices for comparing two signals to be compared with one another. The device may be, for example, a comparison device which, in given corresponding time intervals, compares the amplitudes of two received signals to be compared with one another. Alternatively, it may be a device which compares the frequencies or frequency spectra of the received signals to be compared with one another. A particularly simple comparison is possible if there are provided devices for deriving synchronizing signals from the received picture signal supplied by the tuner of the television receiver and the received picture signal supplied by the tuner of the video recorder and the comparison device is adapted to compare the synchronizing signals derived from the two picture signals. This is because a comparison device having only a comparatively small number of parts can be used in the case of comparison of the two synchronizing signals.

It has proved to be very advantageous if such a comparison device is formed by a correlation device. Such correlation devices have the advantage that the use of the correlation technique makes them comparatively independent of the amplitudes and phase relationships of the received signals to be compared. For the correlation technique reference may made to the relevant literature, for example to the book entitled "Korrelationstechnik, ein neuer Zweig der Betriebsmeβtechnik", published by Lexika-Verlag in the Federal Republic of Germany in 1977 and bearing the ISBN number 3-88146-104-3.

BRIEF DESCRIPTION OF THE DRAWINGS

The invention will now be described in more detail with reference to the drawings, which show two exemplary embodiments to which the invention is not limited in which:

FIGS. 4A–4H show waveform diagrams of signals in the comparison device shown in FIG. 3.

DESCRIPTION OF THE PREFERRED EMBODIMENT

Figure 1:
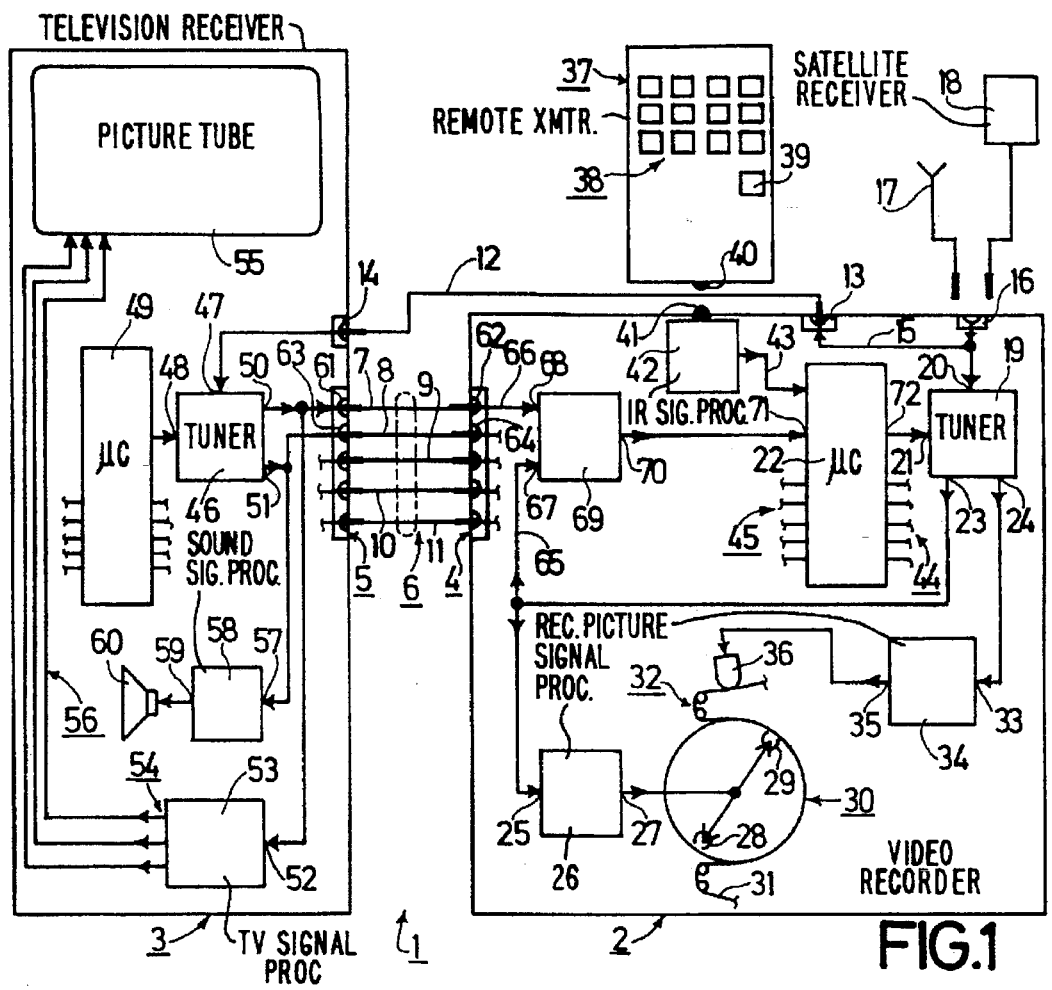
FIG. 1 shows diagrammatically a video system comprising a television receiver and a video recorder in accordance with a first embodiment of the invention, which video recorder is connected to the television receiver by a multi-core cabling and comprises a comparison device for comparing the luminance signal components of the received picture signals supplied by a tuner of the video recorder and a tuner of the television receiver.

FIG. 1 shows a video system 1 comprising a video recorder 2 in accordance with a first embodiment of the invention and a television receiver 3. The video recorder 2 and the television receiver 3 each comprise a connector, 4 and 5 respectively, usually referred to as a SCART socket. The two connectors 4 and 5 are interconnected by a multi-core cabling 6, of which five cores or lines 7, 8, 9, 10 and 11 are shown. The cabling 6 serves for the signal transmission between the video recorder 2 and the television receiver 3, the transmission from the television receiver 3 to the video recorder 2 being possible via the line 7 for picture signals received and demodulated by the television receiver 3 and via the line 8 for sound signals received and demodulated by the television receiver 3. Further signals can be transmitted either from the television receiver 3 to the video recorder 2 or, conversely, from the video recorder 2 to the television receiver 3 via the other lines 9, 10 and 11 and further lines, not shown.

A further transmission line 12 between the video recorder 2 and the television receiver 3 serves for transmitting non-demodulated television signals and is connected to a socket 13 of the video recorder 2 and to a socket 14 of the television receiver 3. The socket 13 of the video recorder 2 is connected to a socket 16 of the video recorder 2 via a so-called loop-through line 15 of the video recorder 2. The socket 16 serves for the connection of a receiving aerial 17, a satellite television receiving device 18, shown diagrammatically in FIG. 1, or a cable television receiving device, not shown in FIG. 1.

The video recorder 2 has an electronically tunable tuner 19 whose television signal input 20 is connected to the socket 16. The tuner 19 has a control input 21 to which control signals can he applied, which control signals can be generated and supplied by a control device 22 formed by a microcomputer 22. One of these control signals starts a successive tuning of the tuner 19 of the video recorder 2 to different stations and another one of these control signals causes the tuner 19 of the video recorder 2 to be locked to a previously tuned station. The tuner 19 of the video recorder 2 has a first output 23 and a second output 24. On the first output 23 the tuner 19 supplies a demodulated picture signal. On the second output 24 the tuner 19 supplies a demodulated sound signal.

The first output 23 of the tuner 19 is connected to a recording picture signal processor 26, whose output 27 is connected to two rotatably drivable magnetic heads 28 and 29 of a drum-shaped scanning device 30. By means of four cylindrical tape guides of a tape threading device 32, a magnetic tape 31 is wrapped around the drum-shaped scanning device 30 along a helical path through an angle of approximately 180°, so that the rotatably drivable magnetic heads 28 and 29 consecutively scan adjacent track portions which are inclined relative to the longitudinal direction of the magnetic tape 31, in which track portions the picture signals supplied by the recording picture signal processor 26 are recorded.

The second output 24 of the tuner 19 is connected to an input 33 of a recording sound signal processor 34, whose output 35 is connected to a stationary magnetic head 36, which is also in scanning contact with the magnetic tape 31 and by means of which the sound signals supplied by the recording sound signal processor 34 can be recorded on the magnetic tape 31 in a sound signal track which extends in the longitudinal direction of the magnetic tape 31.

To control the modes of operation and operating functions of the video recorder 2, there is provided a remote control device 37 having a set of keys 38 for the entry of remote-control commands. The remote control device 37 has further keys which are concealed by a cover, not shown, and which are consequently not visible in FIG. 1. The set of keys 38 of the remote control device 37 includes a key 39 by means of which a so-called "follow-me" command can be given, as will be described in detail hereinafter.

The remote control device 37 comprises an infrared signal transmitter 40, which conveys the remote control commands generated in the remote control device 37 to an infrared signal receiver 41 of the video recorder 2 by means of infrared signals. The infrared signal receiver 41 forms part of an infrared signal processor 42, which processes the received infrared signals and which supplies dam corresponding to the received remote control commands to the microcomputer 22 via a data connection 43, represented as a single line in FIG. 1. The microcomputer 22 processes the data corresponding to the received remote control commands and produces on its control outputs 44 control commands which control the units of the video recorder necessary to perform the mode or function corresponding to the received remote control command. It is to be noted that the microcomputer 22 also has a plurality of further control inputs 45 via which further control signals can be applied to the microcomputer 22.

The television receiver 3 also has a tuner 46 whose television signal input 47 is connected to the socket 14, so that the television signal received by means of, for example, a television aerial 17 can be applied to the socket 14 via the socket 16, the loop-through line 15, the socket 13 and the transmission line 12 and hence to the tuner 46 of the television receiver 3 via the input 47. The tuner 46 of the television receiver 3 is also electronically tunable and, for this purpose, it has a control input 48 to which control signals generated by a control device 49 formed by a microcomputer can be applied to tune the tuner 46 of the television receiver 3 successively to different stations and to keep it tuned to a station. The tuner 46 of the television receiver 3 has a first output 50, and second output 51. On the first output 50 the tuner 46 supplies a demodulated television signal. On the second output 51, the tuner 46 supplies a demodulated sound signal.

The first output 50 of the tuner 46 of the television receiver 3 is connected to the input 52 of a television signal processor 53 which supplies on its outputs 54, of which three outputs are shown in FIG. 1, signals for driving a picture tube 55 of the television receiver 3, which signals are applied to the picture tube 55 via lines 56.

The second output 51 of the tuner 46 of the television receiver 3 is connected to an input 57 of a sound signal processor 58 whose output 59 is connected to a loudspeaker 60 which acoustically reproduces the sound signals supplied by the sound signal processor 58.

The first output 50 of the tuner 46 of the television receiver 3 is further connected to a terminal 61 of the connector 5 of the television receiver 3, which terminal is connected to a contact 62 of the connector 4 of the video recorder 2 via the line 7 of the cabling 6. The second output 51 of the tuner 46 is further connected to a contact 63 of the connector 5 of the television receiver 3, which contact is connected to a contact 64 of the connector 4 of the video recorder 2 via the line 8 of the cabling 6. In this way the received demodulated picture signal on the first output 50 of the tuner 46 and the received demodulated sound signal on the second output 50 of the tuner 46 will be available in the video recorder 2 on the contacts 62 and 64 of the connector 4 of the video recorder 2.

Advantageously, the first output 23 of the tuner 19 of the video recorder 2 is connected to an input 67 of a comparison device 69 of the video recorder 2 via a line 65 and the contact 62 of the connector 4 of the video recorder 2 is connected to an input 68 of this comparison device via a line 66. The comparison device 69 of the video recorder 2 serves for comparing at least one component of the received picture signal supplied by the tuner 46 of the television receiver 3 to the connector 4 of the video recorder 2 with the corresponding component of the received picture signal supplied by the tuner 19 of the video recorder 2. In the present case, the comparison device 69 is adapted to compare the luminance signal component Y-TV of the picture signal supplied by the tuner 46 of the television receiver 3 with the luminance signal component Y-VR of the picture signal supplied by the tuner 19 of the video recorder 2, which will be described in more detail with reference to FIGS. 3 and 4. The comparison device 69 is constructed to supply an inequality signal S1 in the case of inequality of the two received picture signals applied to it, and to supply an equality signal S2 in the case of equality of the two received signals applied to it. The inequality signal S1 and the equality signal S2 appear on an output 70 of the comparison device 69. Alternatively, a comparison device 69 may have two separate outputs to supply the inequality signal and the equality signal, respectively.

In the video recorder 2 of the video system 1 shown in FIG. 1 the output 70 of the comparison device 69 is connected to a control input 71 of the microcomputer 22. The microcomputer 22 detects the presence of the inequality signal S1 or the equality signal S2. If the microcomputer 22 detects an inequality signal S1, the microcomputer 22 produces on a control output 72, which is connected to the control input 21 of the tuner 19 of the video recorder 2, a control signal which causes the tuner 19 of the video recorder 2 to be successively tuned to different stations. If the microcomputer 22 detects an equality signal S2 the microcomputer 22 produces on its control output 72 a control signal which is applied to the control input 21 of the tuner 19 of the video recorder 2 and which keeps the tuner 19 of the video recorder 2 tuned to a previously selected station.

In operation of the video system 1, the tuner 46 of the television receiver 3 and the tuner 19 of the video recorder 2 are very often tuned to different stations broadcasting different programs, i.e. different program signals. However, very often a user of the video system 1 wishes to tune the tuner 19 of the video recorder 2 accurately and rapidly to the same station as the tuner 46 of the television receiver 3, for example to record the television program watched by the user on the television receiver 3 by means of the video recorder 2 without any significant delay.

In order to achieve this, the user of the video system 1 shown in FIG. 1 merely has to actuate the "Follow me" key 39 on the remote control device 37 for the video recorder 2. As a result of the actuation of the key 39 a corresponding remote control command is transmitted to the infrared signal processor 42, which supplies a corresponding control signal to the microcomputer 22 via the connection 43, causing the microcomputer 22 to produce on its control output 72 a control signal, which is applied to the control input 21 of the tuner 19 of the video recorder 2 and which causes the tuner 19 of the video recorder 2 to be successively tuned to different stations. Each time that it is tuned to a station the tuner 19 supplies the picture signal produced on its first output 23 to the first input 67 of the comparison device 69 via the line 65, the picture signal supplied by the tuner 46 of the television receiver 3 being applied to the second input 68 of this device. As long as the tuner 19 of the video recorder 2 is tuned to a station transmitting a program signal which differs from the program signal transmitted by the station to which the tuner 46 of the television receiver 3 is tuned, the comparison device 69 produces on its output 70 an inequality signal S1, which is applied to the control input 71 of the microcomputer 22. In response to the inequality signal S1 applied to it, the microcomputer 22 generates a control signal on its control output 72, which signal is applied to the control input 21 of the tuner 19 of the video recorder 2 and which, in the same way as the control signal caused by actuation of the "Follow me" key 39 of the remote control device 37, results in the tuner 19 of the video recorder 2 being successively tuned to different stations. As soon as the tuner 19 of the video recorder 2 is tuned to a station transmitting a program signal corresponding to the program signal transmitted by the station to which the tuner 46 of the television receiver 3 is tuned, the television signals applied to the two inputs 67 and 68 of the comparison device 69 will be equal, as a result of which the comparison device 69 produces an equality signal S2 on its output 70, which signal is applied to the control input 71 of the microcomputer 22. In response to the equality signal S2, the microcomputer 22 produces a control signal on its control output 72, which control signal is applied to the control input 21 of the tuner 19 of the video recorder 2 and keeps the tuner 19 of the video recorder 2 tuned to the station just tuned in to.

By the actuation of the "Follow me" key 39 it is possible to start, via the microcomputer 22, a so-called station search of the tuner 19 of the video recorder 2, during which the reception of all the stations that can be received is tested, for example starting from an initial position. Since such a station search may have proceeded for comparatively long time before a station is found which transmits a program signal corresponding to the program signal transmitted by the station to which the tuner 46 of the television receiver 3 is tuned, the "Follow me" key 39 of the remote control device 37 may be actuated to start another station search, in which for example the characteristic station data stored in a memory of the microcomputer 22 are successively applied to the tuner 19 of the video recorder 2, as a result of which the tuner 19 is tuned to different stations at short time intervals on the basis of the characteristic data applied to this tuner. Such a station search can substantially speed up the location of a station to which the tuner 46 of the television receiver 3 is tuned. If, by means of such a station search, it is not possible to find a station transmitting the same program signal as the station to which the tuner 46 of the television receiver 3 is tuned because the characteristic data for this station has not yet been stored in the memory of the microcomputer 22, the microcomputer 22 can subsequently automatically start a station search in the tuner 19 of the video recorder 2, in which case it is ensured that a station is found which transmits the same program signal as the station to which the tuner 46 of the television receiver 3 is tuned. After the tuner 19 of the video recorder 2 has been tuned to this station, the characteristic data corresponding to this station may also be stored in the memory provided for this purpose in the microcomputer 22 of the video recorder 2.

In the manner described above the tuner 19 of the video recorder 2 can be tuned very simply and, normally, also very rapidly to a station which transmits the same television program as the station to which the tuner 46 of the television receiver 3 is tuned.

Figure 2:
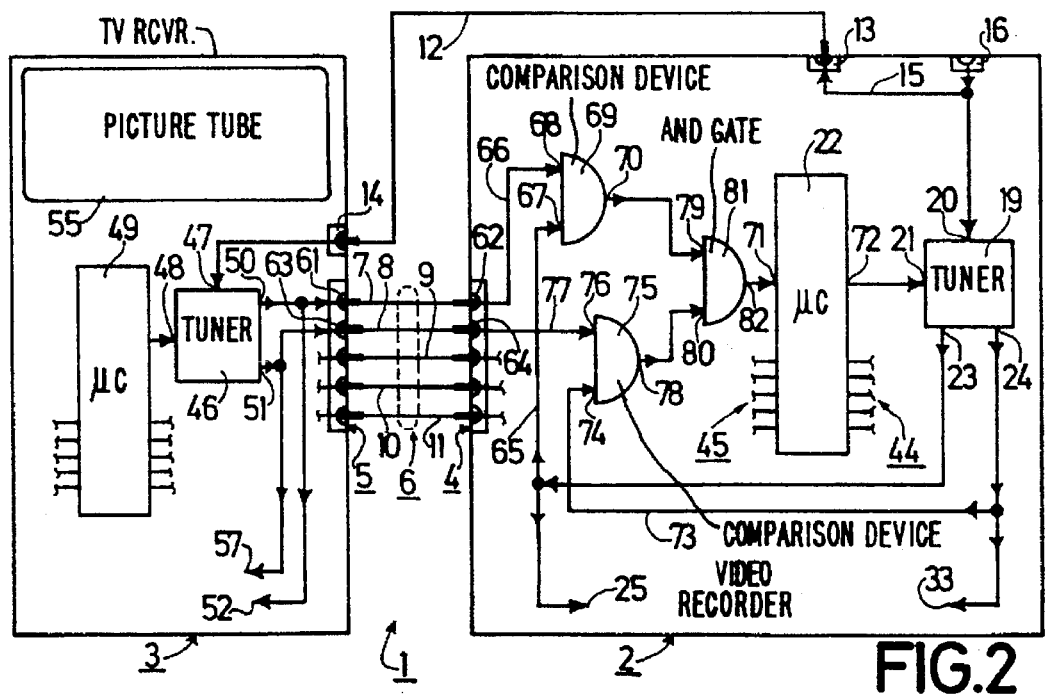
FIG. 2 shows diagrammatically a video system comprising a television receiver and a video recorder in accordance with a second embodiment of the invention, which video recorder is connected to the television receiver by a multi-core cabling and comprises a comparison device for comparing the received picture signals supplied by a tuner of the video recorder and a tuner of the television receiver, and a comparison device for comparing the received sound signals supplied by a tuner of the video recorder and a tuner of the television receiver, the two comparison devices being formed by correlation devices.

FIG. 2 shows a video system 1 which includes a video recorder 2 in accordance with a second embodiment of the invention. In the video recorder 2 of the video system 1 shown in FIG. 2, the first output 23 of the tuner 19 of the video recorder 2 is connected to the first input 67 of a first comparison device 69 via the line 65, and the contact 62, which is connected to the first output 50 of the tuner 46 of the television receiver 3 via the line 7 of the cabling 6, is connected to the second input 68 of the first comparison device 69 via the line 66. In the present case the first comparison device 69 is formed by a correlation device, which compares the received demodulated picture signals applied to its two inputs 67 and 68 with one another by means of a correlation technique. The construction of the first comparison device 69 as a correlation device has the advantage that owing to the use of the correlation technique the comparison of the two signals to be compared is substantially independent of the amplitudes and phase relationships of the signals to be compared. In the case of inequality of the signals which are compared with one another, the first correlation device 69 produces an inequality signal on an output 70, whereas in the case of equality of the signals which are compared with one another the first correlation device 69 produces an equality signal on its output 70.

Moreover, in the video recorder 2 of the video system 1 shown in FIG. 2, the second output 24 of the tuner 19 is connected to a first input 74 of a second comparison device 75 via a line 73. A second input 76 of the second comparison device 75 is connected to the contact 64 of the connector 4 of the video recorder 2 via a line 77. The contact 64 is connected to the contact 63 of the connector 5 of the television receiver 3 via the line 8 of the cabling 6, which contact 63 is connected to the second output 51 of the tuner 46 of the television receiver 3. Thus, the demodulated sound signal appearing on the second output 24 of the tuner 19 and the demodulated sound signal appearing on the second output 51 of the tuner 46 can be applied to the inputs 74 and 76 of the second comparison device 75. In the present case, the second comparison device 75 is also formed by a correlation device, which has the advantage that also during the comparison of the demodulated sound signals a comparatively great independence of the amplitudes and phase relationships of the sound signals to be compared is achieved. In the case of inequality of the sound signals applied to the second comparison device 75, this device produces an inequality signal on an output 78, whereas in the case of equality of the sound signals applied to the second comparison device 75 this device produces an equality signal on its output 78.

The output of the first comparison device 69 and the output of the second comparison device 75 are connected to the inputs 79 and 80 of an AND gate 81, whose output 82 is connected to the control input 71 of the microcomputer 22. As long as one of the two comparison devices 69 and 75 supplies an inequality signal the AND gate 81 will also produce an inequality signal on its output 82, which signal is processed in the microcomputer 22, which produces on its control output 72 a control signal which is applied to the control input 21 of the tuner 19 of the video recorder 2, as a result of which the tuner 19 of the video recorder 2 is successively tuned to different stations. If by the tuner 19 of the video recorder 2 subsequently detects a station transmitting the same program signal as the station to which the tuner 46 of the television receiver 3 is tuned, the two comparison devices 69 and 75 will each supply an equality signal, as a result of which the AND gate 81 also supplies an equality signal, which is applied to the microcomputer 22. Subsequently, the microcomputer 22 generates a corresponding control signal, which is applied to the tuner 19 of the video recorder 2 and which ensures that the tuner 19 of the video recorder 2 remains tuned to the station to which it has just been tuned.

By providing two comparison devices 69 and 75, a very high detection accuracy is obtained for two identical program signals each including a picture signal and a sound signal.

Figure 3:
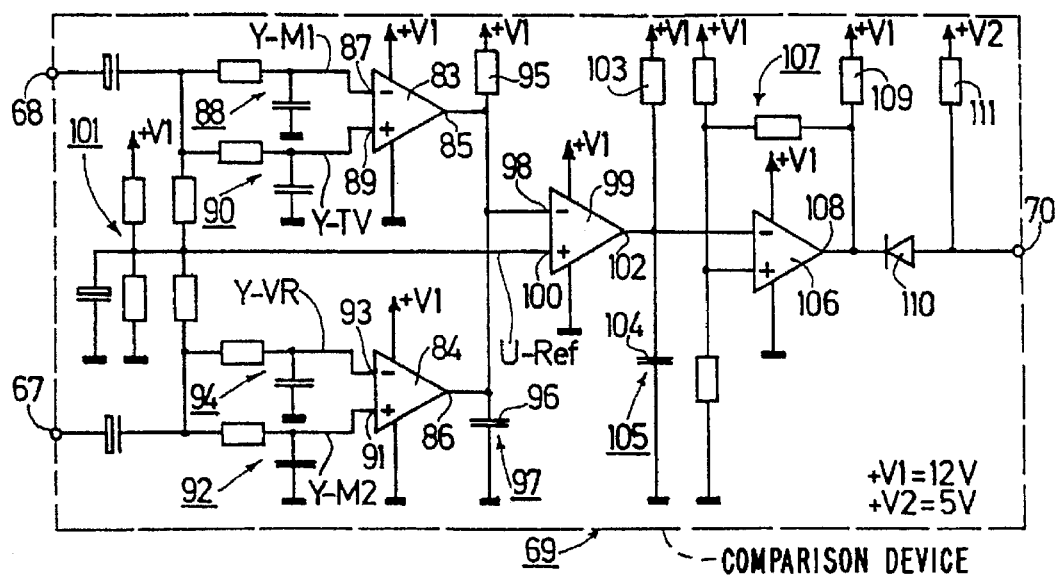
FIG. 3 shows a comparison device adapted to compare the luminance signal components of two received picture signals and suitable for use in a video recorder of the video system shown in FIG. 1.

FIG. 3 shows a comparison device 69 suitable for use in a video recorder 2 of a video system 1 shown in FIG. 1. The comparison device 69 comprises two comparator stages 83 and 84, which are each formed by a differential amplifier having a so-called "open-collector" output, 85 and 86, respectively. The inverting input 87 of the first differential amplifier 83 is preceded by a low-pass filter 88 comprising a resistor and a capacitor and having a comparatively large time constant. The low-pass filter 88 extracts the luminance signal component Y-TV from the picture signal supplied by the tuner 46 of the television receiver 3 and applied to the second input 68 of the comparison device 69 and forms the average value Y-M1 of the luminance signal component Y-TV, which average value Y-M1 appears on the inverting input 87 of the differential amplifier 83 as a threshold value. The non-inverting input 89 of the first differential amplifier 83 is preceded by a low-pass filter comprising a resistor and a capacitor and having a comparatively small time constant, which filter extracts the luminance signal component Y-TV from the picture signal applied to the second input 68 and applies it to the non-inverting input 89 of the first differential amplifier 83. FIG. 4A, by way of example shows two waveforms of the luminance signal component Y-TV and the average value Y-M1 of this luminance signal component Y-TV. The two signal waveforms shown at the left and the right of FIG. 4A in principle correspond.

The non-inverting input 91 of the second differential amplifier 84 is preceded by a low-pass filter 92 comprising a resistor and a capacitor and having a comparatively large time constant, which filter extracts the luminance signal component Y-VR from the picture signal supplied by the tuner 19 of the video recorder 2 and applied to the first input 67 of the comparison device 69 and forms an average value Y-M2 of the extracted luminance signal component Y-VR, which average value Y-M2 appears on the non-inverting input 91 of the second differential amplifier 84 as a threshold value. The inverting input 93 of the second differential amplifier 84 is preceded by a low-pass filter 94 comprising a resistor and a capacitor and having a comparatively small time constant, which filter extracts the luminance signal component Y-VR from the picture signal applied to the first input 67 and applies it to the inverting input 93 of the second differential amplifier 84. FIG. 4B by way of example, shows two waveforms of the luminance signal component Y-VR and the corresponding average value Y-M2. The waveform of the luminance signal component Y-VR shown at the left in FIG. 4B differs from the waveform of the luminance signal component Y-TV shown at the left in FIG. 4A. However, the waveform of the luminance signal component Y-VR shown at the right in FIG. 4B corresponds to the waveform of the luminance signal component Y-TV shown at the right in FIG. 4A.

The two differential amplifiers 83 and 84 compare the relevant luminance signal component Y-TV or Y-VR with the respective average value Y-M1 or Y-M2. This comparison results in the pulse-shaped signal shown in FIG. 4C appearing on the output 85 of the first differential amplifier 83. As is shown, a pulse-shaped signal will appear on the output 85 each time that the amplitude of the luminance signal component exceeds the average value. The pulse-shaped signal shown in FIG. 4D appears on the output 86 of the second differential amplifier 84. As is shown, a pulse-shaped signal will appear on the output 86 each time that the luminance signal component Y-VR exceeds the average value. Thus, the behavior of the pulse-shaped signal on the output 86 of the second differential amplifier 84 is the inverse of that of the pulse-shaped signal on the output 85 of the first differential amplifier 83, which is because the luminance signal component Y-TV is applied to the non-inverting input 89 and the luminance signal component Y-VR to the inverting input 93 and the average value Y-M1 is applied to the inverting input 87 and the average value Y-M2 to the non-inverting input 91.

The outputs 85 and 86 of the two differential amplifiers 83 and 84 are directly coupled to one another and their common node is situated between a resistor 95 and a capacitor 96, which together form an integrating network 97. By coupling the two "open-collector" outputs 85 and 86 to one another the output signals on these outputs 85 and 86 are logically combined, so that the two output signals shown in FIG. 4C and FIG. 4D yield a combined output signal shown in FIG. 4E. This combined output signal is integrated by the integrating network 97, yielding the signal shown in FIG. 4F.

The signal shown in FIG. 4F is applied to an inverting input 98 of a further differential amplifier 99 forming a comparator stage, whose non-inverting input 100 receives a reference voltage U-Ref formed by means of a voltage divider 101. In the further differential amplifier 99 the two input signals are compared, the signal shown in FIG. 4G being obtained on the output 102 of the further differential amplifier. The signal produced on the output 102 of the differential amplifier 99 is applied to a further integrating network 105 formed by a resistor 103 and a capacitor 104 and having a very large time constant. When a signal dip occurs in the signal shown in FIG. 4G the capacitor 104 is discharged very rapidly via the output transistor, not shown, of the differential amplifier 99, which transistor is disposed between the "open-collector" output 102 of the differential amplifier 99 and ground, and as a result of the large time constant of the integrating network, this capacitor is charged only very slowly after the end of such a signal dip. Consequently, only a low potential will be obtained across the capacitor 104 as long as signal dips occur in the signal as shown at the left in FIG. 4G. However, if no signal dips occur, as shown at the right in FIG. 4G, a higher potential will be obtained across the capacitor 104.

The potential across the capacitor 104 is applied to a Schmitt trigger 107 formed by means of a further differential amplifier 106. In the case of a low potential across the capacitor 104 the output transistor, not shown, of the differential amplifier 106, which transistor is disposed between the "open-collector" output 108 of the differential amplifier 106 and earth, is cut off so that, via a resistor 109, the potential +V1 appears on the output 108, which potential is isolated from the output 70 of the comparison device 69 by a diode 110, as a result of which the potential +V2 is obtained on the output 70 via a resistor 111, which potential forms the inequality signal S1 shown at the left in FIG. 4H and can be applied directly to the microcomputer 22. In the case of a high potential across the capacitor 104, the output transistor, not shown, of the differential amplifier 106, which transistor is disposed between the "open-collector" output 108 of the differential amplifier 106 and ground, is turned on so that the output 108 of the differential amplifier is pulled to ground, resulting in a current via the resistor 111, the diode 110 and the output transistor, not shown, of the differential amplifier 106, resulting in a potential relative to ground which corresponds to the voltage drop across the conductive diode 110, which potential forms the equality signal S2 shown at the right in FIG. 4H and can be applied directly to the microcomputer 22.

The comparison device described with reference to FIG. 3 is merely one possibility of implementing such a comparison device. For example, to detect the equality of two picture signals it is also possible to compare the color signal components of these two picture signals. Moreover, it is also possible to compare the separated luminance signal components as well as the separated color signal components, or to compare the combined luminance signal components and color signal components. Besides, it is also possible to digitize the signals to be compared with one another and subsequently compare them with one another by means of a comparison device constructed in digital technology by means of a microcomputer.

Figure 5:
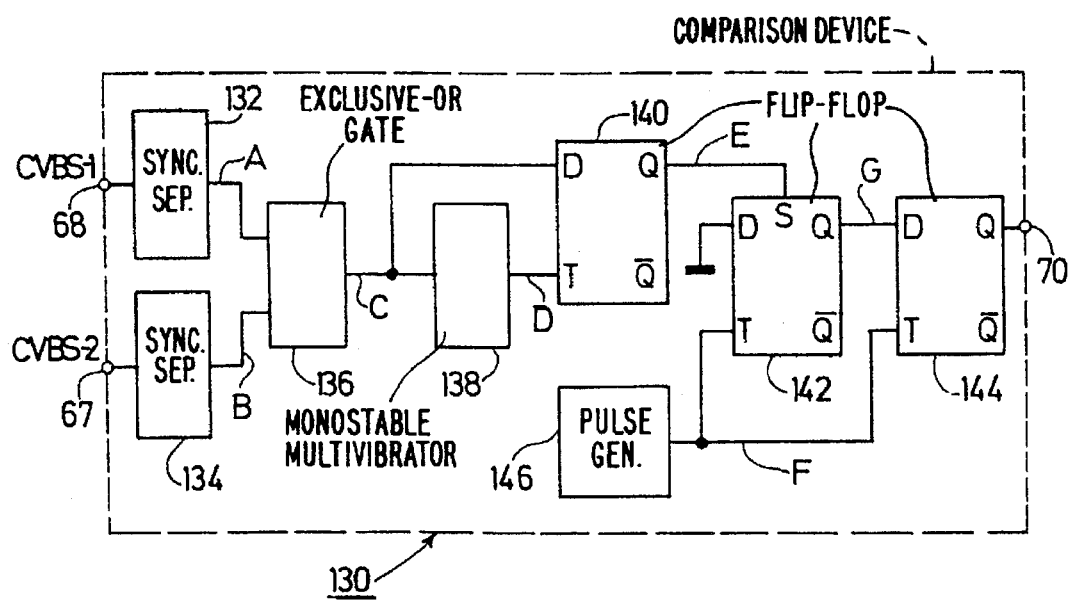
FIG. 5 shows a comparison device of a video recorder in accordance with a further embodiment of the invention, which device is adapted to compare the synchronizing signals derived from the received picture signal supplied by the tuner of the video recorder and from the received picture signal supplied by the tuner of a television receiver connected to the video recorder.

FIG. 5 shows a further variant of a comparison device bearing the reference numeral 130. The comparison device 130 comprises two sync separators 132 and 134, which each have an input coupled to one of the respective inputs 68 or 67 of the comparison device 130. The outputs of the sync separators 132 and 134 are coupled to inputs of an EXCLUSIVE OR gate 136. The output of the EXCLUSIVE OR gate 136 is coupled to an input of a monostable multivibrator 138 and to the D input of a first D flip-flop circuit 140. The output of the multivibrator 138 is coupled to the clock input T of the first D flip-flop circuit 140. The Q output of the first D flip-flop circuit 140 is coupled to the set input S of a second D flip-flop circuit 142, whose D input is coupled to a point of constant potential, in the present case ground potential. The Q output of the second D flip-flop circuit 142 is coupled to the D output of a third D flip-flop circuit 144, whose Q output is coupled to the output 70 of the comparison device 130. The comparison device 130 further includes a generator 146 having an output on which pulses F having a repetition frequency of, for example, 50 Hz are produced, which output is coupled to the clock inputs T of the second D flip-flop circuit 142 and the third D flip-flop circuit 144.

The operation of the comparison device 130 for determining a correlation between two picture signals applied to the inputs 68 and 67 will be explained hereinafter.

When the tuner 19 of the video recorder 2 and the tuner 46 of the television receiver 3 are tuned to the same frequency and consequently receive the same station, the picture signals (CVBS) are in synchronism. Slight differences in timing may occur because the two tuners 19 and 46 have different IF filters, which are, for example, formed by means of coils and capacitors or which operate with acoustic surface wave devices. However, the resulting time differences are smaller than 1 µs.

The synchronization signals A and B derived from the two picture signals CVBS-1 and CVBS-2 by the two sync separators 132 and 134 are applied to the EXCLUSIVE OR gate 136. This EXCLUSIVE OR gate 136 formes a pulse-shaped difference signal C. The difference signal C has a high level "H" in the case of a difference between the synchronization signals A and B. If the synchronization signals A and B originate from the same transmitter, the difference signal. C has a substantially low level "C" and this difference signal C will at the most exhibit short pulses having a high level "H" and a duration smaller than 1 µm.

On every rising edge of the pulse-shaped difference signal C the monostable multivibrator 138 is started and forms a pulse D having a high level "H" and a length of 1 µs. When the trailing edge of a pulse D occurs the trailing edge of the difference signal C has already ended, i.e. the difference signal C again exhibits a low level "L" if the synchronization signals A and B stem from the same transmitter. In this case the first D flip-flop circuit 140 always generates a signal with a low level "L", so that the output signal E remains at a low level "L". However, as soon as the pulse-shaped difference signal C exhibits a high level "H" longer than 1 µs the first D flip-flop circuit 140 will supply a signal with a high level "H" and the output signal E will assume a high level "H".

An output signal with a high level "H" from the first D flip-flop circuit 140 results in a signal with a high level "H" on the Q output of the second D flip-flop circuit 142, regardless of the signals on the T input and the D input of the second D flip-flop circuit 142. In the present case the generator 146 produces 50 times per second a signal with a low level "L" in the second D flip-flop circuit 142. As a result, the output signal G on the Q output of the second D flip-flop circuit 142 is transferred as an input signal G to the D input of the third D flip-flop circuit 144 at each clocking instant.

This has the following meaning.

If a pulse-shaped difference signal C with a high level "H" longer than 1 µs occurs within the period of approximately 1/50 second of the generator signal F from the generator 146, the signal on the output 70 of the comparison device 130 will have a high level "H" for the next 1/50 second. This signal with a high level "H" represents the inequality signal of this comparison device 130, which signal is used in the video recorder 2 to start the successive tuning of the tuner 19 of the video recorder 2 to different stations.

The signal on the output 70 of the comparison device 130 only has a low level "L" if the synchronization signals A and B, i.e. the horizontal as well as the vertical synchronization signals, are synchronous within 1 µs. This signal with a low level "L" represents the equality signal of this comparison device 130, which signal is used in the video recorder 2 to keep the tuner 19 of the video recorder 2 at a previously selected station. If the synchronization signals A and B are not in synchronism the signal on the output 70 of the comparison device 130, as already stated, will have a high level "H". This signal indicates that them is no synchronism.

It is to be noted hem that the circuit arrangement shown in FIG. 5 does not function if the sync separators 132 and 134 no longer supply synchronization signals A and B. This may happen if the television station to be received is no longer transmitting. For this situation a separate protection device may be provided.

In addition, it is to be noted that the generator 146 need not necessarily generate pulses having a pulse repetition frequency of 50 Hz. For a video recorder intended for processing NTSC signals it is advantageous to use, for example, a generator generating pulses with a pulse repetition frequency of 60 Hz. In general, the pulse repetition frequency of the pulse-shaped generator signal produced by the generator 146 should be selected in such a manner that at least one field synchronization signal occurs within one period of the generator signal.

Moreover, it is to be noted that the monostable multivibrator 138 may also be constructed to supply pulses of a pulse duration which differs from 1 µs, so that the comparison accuracy can be adapted to different requirements.

We claim:

1. A video recorder having an electronically tunable tuner for selectively tuning to any one station of a plurality of stations, said tuner, after being tuned to one of said plurality of stations, supplying a received picture signal and a received sound signal, said video recorder having a connector to which a cable is connectable, said cable also being connectable to a connector of a television receiver, said television receiver also having a tuner for selectively tuning to any one station of a plurality of stations, said tuner in said television receiver, after being tuned to one of said plurality of stations, supplying a received picture signal and a received sound signal, said received picture signal and said received sound signal from said tuner in said television receiver being applied to the connector of said television receiver, characterized in that said video recorder comprises a comparison device connected to the tuner of the video recorder and to the connector of the video recorder for comparing at least one component of one of the received picture signal and the received sound signal supplied by tuner of the the video recorder, with a corresponding component of a corresponding signal of the received picture signal and the received sound signal supplied by the tuner of the television receiver when said video recorder is connected to said television receiver by said cable, said comparison device supplying an inequality signal in the case of inequality of the at least one component and the corresponding component, and supplying an equality signal in the case of equality of the at least one component and the corresponding component; and said video recorder comprises means, coupled to said at least one comparison device, for causing the tuner of the video recorder to successively tune to different stations when said comparison device supplies said inequality signal, and for causing the tuner of the video recorder to remain tuned to a station when said comparison device supplies said equality signal.

2. A video recorder as claimed in claim 1, characterized in that the received picture signal supplied by the tuner of the television receiver and applied to the video recorder, and the received picture signal supplied by the tuner of the video recorder are applied to said comparison device, and that said comparison device compares luminance signal components of the two received picture signals.

3. A video recorder as claimed in claim 1, characterized in that the received sound signal supplied by the tuner of the television receiver and applied to the video recorder, and the received sound signal supplied by the tuner of the video recorder are applied to said comparison device, and said comparison device compares the two received sound signals.

4. A video recorder as claimed in claim 1, characterized in that said video recorder further comprises means for deriving synchronization signals from the received picture signal supplied by the tuner of the television receiver and from the received picture signal supplied by the tuner of the video recorder, and in that said comparison device compares the synchronization signals derived from the two received picture signals.

5. A video recorder as claimed in claim 1, characterized in that said comparison device is formed by a correlation device.

6. A video recorder as claimed in claim 2, characterized in that said video recorder further comprises a further comparison device for comparing the received sound signal supplied by the tuner of the television receiver and applied to the video recorder, and the received sound signal supplied by the tuner of the video recorder.

7. A video recorder as claimed in claim 2, characterized in that said video recorder further comprises means for deriving synchronization signals from the received picture signal supplied by the tuner of the television receiver and from the received picture signal supplied by the tuner of the video recorder, and a further comparison device for comparing the synchronization signals derived from the two received picture signals.

8. A video recorder as claimed in claim 3, characterized in that said video recorder further comprises means for deriving synchronization signals from the received picture signal supplied by the tuner of the television receiver and from the received picture signal supplied by the tuner of the video recorder, and a further comparison device for comparing the synchronization signals derived from the two received picture signals.

9. A video recorder as claimed in claim 6, characterized in that said video recorder further comprises means for deriving synchronization signals from the received picture signal supplied by the tuner of the television receiver and from the received picture signal supplied by the tuner of the video recorder, and a further comparison device for comparing the synchronization signals derived from the two received picture signals.

10. A video recorder as claimed in claim 2, characterized in that said comparison device is formed by a correlation device.

11. A video recorder as claimed in claim 3, characterized in that said comparison device is formed by a correlation device.

12. A video recorder as claimed in claim 4, characterized in that said comparison device is formed by a correlation device.

13. A video recorder as claimed in claim 6, characterized in that said comparison device and said further comparison device are formed by correlation devices.

14. A video recorder as claimed in claim 7, characterized in that said comparison device and said further comparison device are formed by correlation devices.

15. A video recorder as claimed in claim 8, characterized in that said comparison device and said further comparison device are formed by correlation devices.

16. A video recorder as claimed in claim 9, characterized in that said comparison device and said further comparison devices are formed by correlation devices.

* * * * *